US008894296B2

(12) United States Patent
Peto

(10) Patent No.: US 8,894,296 B2
(45) Date of Patent: Nov. 25, 2014

(54) POWERED CAT 5 PLUG AND SOCKET

(76) Inventor: Raymond John Peto, Dorset (GB)

( * ) Notice: Subject to any disclaimer, the term of this patent is extended or adjusted under 35 U.S.C. 154(b) by 132 days.

(21) Appl. No.: 13/503,965

(22) PCT Filed: Nov. 1, 2010

(86) PCT No.: PCT/GB2010/002015
§ 371 (c)(1),
(2), (4) Date: Jul. 9, 2012

(87) PCT Pub. No.: WO2011/051686
PCT Pub. Date: May 5, 2011

(65) Prior Publication Data

US 2012/0269484 A1 Oct. 25, 2012

(30) Foreign Application Priority Data

Oct. 31, 2009 (GB) .................................. 0919157.8

(51) Int. Cl.
*G02B 6/36* (2006.01)
*H01R 24/58* (2011.01)
*H01R 24/60* (2011.01)
*H01R 107/00* (2006.01)

(52) U.S. Cl.
CPC ............ *H01R 24/60* (2013.01); *H01R 2107/00* (2013.01)
USPC ................................................ 385/53; 385/76

(58) Field of Classification Search
USPC .................................. 385/53-60, 88-93, 147
See application file for complete search history.

(56) References Cited

U.S. PATENT DOCUMENTS

| | | | | |
|---|---|---|---|---|
| 2003/0232535 | A1 * | 12/2003 | Pepe et al. | 439/489 |
| 2006/0090861 | A1 * | 5/2006 | Wu | 160/188 |
| 2009/0215320 | A1 * | 8/2009 | Iranpour Feridani et al. | 439/660 |

* cited by examiner

*Primary Examiner* — Akm Enayet Ullah
(74) *Attorney, Agent, or Firm* — William H. Bollman

(57) ABSTRACT

The invention provides a plug (100) which is adapted to be connected to a cable, such as an Ethernet cable, the plug (100) having a generally rectangular cross section and being dimensioned and arranged to be received by an aperture in a socket. On opposite lateral faces of the plug a region, or layer, of conductive material (24, 26) is provided for the transmission of electrical current to/from the cable. Use of the invention therefore permits cabling that has conventionally been used to supply data to also supply power, typically in excess of 200 Watts or so. Such amounts of power are sufficient for operating most equipment that also requires a data connection.

32 Claims, 9 Drawing Sheets

POWERED CAT 5 PLUG AND SOCKET

BACKGROUND

This invention relates to a plug for data transmission and/or power supply, and to a socket for insertion of a plug therein.

There are a number of different plug-in connectors that the invention is applicable to, including, but not limited to Ethernet type connectors and USB connectors. Note that the Ethernet connection method as described above commonly uses a standard 8P8C connector which is loosely but erroneously called by the data communications industry an 'RJ45'. RJ45 in fact describes a rarely used keyed variant of 8P2C with a special wiring arrangement for a telephone application.

PRIOR ART

It is known from DE-A-10053843 (Siemens AG) to provide an Ethernet plug-in connector with independent contact elements for providing a voltage supply. In this invention, the voltage supply is provided by contacts located on an outside surface of the socket. Thus, the corresponding plug requires an additional connector to connect with the voltage supply. A problem with this is that both the plug and socket are enlarged so are no longer interchangeable with existing equipment and the cost of manufacturing the extra elements is significant.

A further development is disclosed in WO-A1-02067387 (Siemens AG) which provides a power supply whilst maintaining a standard plug and socket design. Two pairs of co-operating connectors are provided on the connecting faces of the plug and socket. These power connectors are designed in the same manner as the data connectors i.e. a groove in the plug accepts an outwardly extending spring contact provided in the socket on insertion of the plug therein.

Although this improvement provides a reduction in cost compared to the earlier advance, full interchangeability between the new sockets and existing plugs is not provided due to the provision of the extra spring contacts for which no corresponding groove is provided in existing plugs. Thus complete insertion of an existing plug with a new socket is not achievable so may result in a loose connection.

U.S. Pat. No. 4,869,677 (Teradyne Inc) describes a two-part connector which provides an electrical connection between a backplane printed circuit board (PCB) and a daughter 'PCB', through which power may be transmitted. One part of the connector carries a contact on one side wall, and another part of the connector carries a corresponding contact on a facing outside wall.

It is known to incorporate two opposing pairs of contacts into a plug or socket for purposes other than power provision. For example, such devices are described in U.S. Pat. No. 4,813,890 (Siemens AG), U.S. Pat. No. 5,415,570 (AT&T) and EP 0 891 017 (Framatome), which all disclose pairs of contacts providing electrical shielding.

The device in U.S. Pat. No. 5,415,570 (AT&T) provides data connections and the arrangement shown in U.S. Pat. No. 5,356,300 (The Whittaker Corporation) describes pairs of contacts that are used as ground contacts.

Some examples of uses of universal serial bus (USB) connectors include: wireless Internet access and printer connections. Whilst these provide the required speed that a user expects, there can be issues with the security of such technology and interference from other wireless networks in the local area. There have also been health related concerns raised about the use of wireless technology due to a possible increase in electro-magnetic radiation of such systems.

Hence, one object of the invention is to provide an acceptable alternative to the use of these wireless technologies by providing a reliable and acceptable rate of data transfer using the existing Ethernet port position provided on the equipment but fitting the connector with power and/or optical data capability within the cabling between the different pieces of equipment.

An aim of the present invention is to provide a plug and socket or plug-in connector which may be deliberately non interchangeable with existing standard plugs and sockets, and which may have at least one form of connectivity between the plug and socket.

Another aim of the invention is to provide a connector system for use intermediate an external environment and a user interface for the purposes of acting to distribute power and data.

SUMMARY OF THE INVENTION

According to a first aspect of the invention there is provided a plug which is adapted to be connected to a cable, the plug having a generally rectangular cross section and being dimensioned and arranged to be received by an aperture in a socket, characterised in that on opposite (lateral) faces of the plug a region, or layer, of conductive material is provided for the transmission of electrical current to/from the cable.

As generally, in use, plugs are connected to cables, it is understood that the invention includes a plug in combination with a length of cable.

Use of the invention therefore permits cabling, that has conventionally been used to supply data, to also supply power, typically in excess of 200 Watts or so. Such amounts of power are sufficient for operating most equipment that also requires a data connection.

In addition, optionally the invention provides a plug and socket, or plug-in connector, which is interchangeable with existing standard plugs and sockets, having at least one form of connectivity between the plug and socket. However, in such an arrangement additional circuitry is provided so as to prevent inadvertent shorts or unwanted power transmission and to protect against overload.

Ideally the plug has a conductive material for conducting an electric current capable of carrying in excess of 3 Amps of current, preferably in excess of 5 Amps of current and most preferably in excess of 10 Amps of current.

In addition the plug and ancillary and the conductive material may be rated to conduct an electric current capable of supplying in excess of 50 Watts of power, preferably in excess of 200 Watts of power and most preferably in excess of 500 Watts of power.

It is thus appreciated that use of the invention in its broadest sense enables a domestic user to effectively devise a single 'backbone' of cabling and to site or locate plugs peripheral or indeed a myriad devices at any point on the cable without the need to be concerned with a nearby power supply, for example in which to plug a transformer for powering the peripheral device and—importantly—without the clutter of different cables and accessories.

The Universal Serial Bus (USB) is considered a short haul (1 to 3 meters) format for computer interfacing. A conventional connection arrangement designated as a USB connector already incorporates a limited power 5 Volt power supply facility as part of its specification and design. Optical communication may be included into this format by including the fibre within the tongue that supports the electrical conductors.

In a preferred embodiment the plug includes a support for at least one optical communication cable, which is advantageously formed from a polymer.

Thus in this preferred embodiment of the plug it is understood that because the system is only intended for relatively small installations, it is well suited as a very broadband data carrier and is typically able to operate in excess of several hundred Mega Baud (MBits/sec) to data rates in excess of 1 Giga Baud (GBits/sec) and therefore offers the advantages of an optical data network.

Ideally the optical fibre data cable in the optical data network is a Plastic Optical Fibre (POE). In addition the optical data network distribution system includes a pair of copper cables to form a hybrid cable.

The optical data network may be adapted to be located so that it couples with a distribution device such as a wall plate, which may have one or more sockets, such as an Ethernet socket and/or a power socket.

Alternately the modular optical data network may be adapted to connect with a telecommunications plug or socket. This may be practically achieved by way of a transponder adapted for example to convert one form of digital signal into for example an optical signal.

Other peripheral devices may be connected directly to the optical data network. Examples of these are: a wireless data transmitter/receiver device, such as a Bluetooth (Trade Mark) transceiver or an infra red data transmitter/receiver device or an encoder suitable for converting one signal into another. Other examples of devices include: amplifiers, filters, switches and timers, such as for example a timer can be connected to the network and control other items connected to the bus.

A further feature of the invention is that it may be connected directly to electrical generating devices such as solar panels or windmills/wind turbines, so that in the event of a power failure, or for example when in remote locations, it is still possible to operate basic devices such a personal computer, laptop or other devices.

The two way nature of the power connection of the socket may for example be used in an emergency to allow the internal battery of a laptop to power the system in reverse.

According to a second aspect of the invention there is provided a socket having an aperture which opens to receive a plug, there being a plurality of contacts dimensioned and arranged to receive signals from one or more data channels, characterised in that (lateral) regions of the socket have conductive regions adapted to contact the plug and thereby conduct an electric current.

So as to cooperate with the conductive lateral regions of the plug, the conductive regions in the socket are ideally disposed on opposite faces, supported within the socket, so that they are presented to contact the conductive material provided on lateral regions of the plug.

Ideally shutters, covers or some other displaceable means is provided on the, or each, conductive region(s) so as to prevent any inadvertent shorting (short circuit) across the opposite faces, supported within the socket.

Ideally the conductive regions of the plug and/or socket, if exposed, are electrically isolated from the power available when a legitimate plug is not fully inserted into a legitimate mating socket.

Ideally the conductive material for conducting an electric current that are formed as lateral regions on the plug are capable of carrying in excess of 3 Amps of current, preferably in excess of 5 Amps of current and most preferably in excess of 10 Amps of current.

Accordingly the present invention also provides a connector comprising: a socket having an aperture which opens against a plug-in direction (Z) and comprises a plurality of contacts characterised in that lateral regions of the plug support conductive material for transmitting an electric current.

Ideally at least a second pair of contacts is provided within the aperture wherein the second pair of contacts is capable of providing a power supply or a data connection.

In addition the present invention provides a connector comprising a plug of particular dimensions and having a plurality of outwardly projecting portions which project around the connector and/or towards a plug-in direction (Z) the body and outwardly projecting pip is shaped and dimensioned so as to prevent insertion of the plug into a conventional 8P8C—or similar—socket. This is important because inadvertent insertion of the plug, according to the invention, into an existing 8P8C type socket could result in an earth short or an unintended transfer of a large amount of power to components or a system, not intended or capable of handling large currents, and thus the body shape and pip prevents this from occurring and any ensuing damage. It being understood that inadvertent insertion of existing types of 8P8C plugs into a socket according to the invention would not lead to any damage as lateral surfaces of existing 8P8C plugs are formed from an insulation material.

The pip preferably takes the form of a raised projection, from the plug, having a rectangular cross section that is typically between 5.0 mm and 5.3 mm long and between 0.7 mm and 1.0 mm high.

Alternatively, or in addition to, the body of the plug is adapted to be bigger than bodies of existing 8P8C plugs, thereby rendering the possibility of insertion of the plug into a 8P8C socket impossible.

Also of significant importance is that the unique keying of the plug and socket minimises customer confusion by preventing mating of non matching arrangements.

Alternatively the plug and/or socket can be made with the minimum or maximum dimensions in such a way that it fits all variants in the same manner as a master key opens all doors in a hotel and the individual keys open individual rooms only.

A third embodiment of the invention provides a connector comprising a socket having an aperture which opens against a plug-in direction (Z) and comprises a plurality of contacts and a corresponding plug having an outwardly projecting portion which projects towards a plug-in direction (Z) the outwardly projecting portion comprising a plurality of first contacts wherein the contacts co-operate with the first contacts on insertion of the plug into the socket characterised in that at least a second pair of co-operating contacts is provided within the aperture of the socket and on the outwardly projecting portion of the plug wherein the second pair of co-operating contacts provides a power supply or a data connection on insertion of the plug into the socket.

Ideally the second pair of co-operating contacts provides a power supply and are disposed on lateral; faces or sides of the plug. Respective electrical contacts are provided in the plug.

A data connection includes an optical connection whereby an optical fibre is connectable and a programming connection, for example enabling data I2C programming.

The invention may be embodied in a 10P10C connector providing data and power in the cat-5 Ethernet environment. In such an embodiment the middle 8 contacts may be standard cat-5 contacts (i.e. for data transmission), and the outer 2 contacts may provide a power supply, e.g. a 48 volt supply. Such an arrangement may have the advantage that it is possible to insert a 10 contact plug according to the invention into a standard 8 contact (8P8C) socket, so that the middle 8 contacts provide a data connection while the outer 2 contacts are inactive. Similarly, it is possible to insert a standard 8 contact (8P8C) plug into a 10 contact socket according to the invention.

Moreover, the invention may be incorporated in firstly the ‘service provider side’ of the PDX (Power and Data eXchange) in order that the PDX can send power upstream to power any device required by the service provider, such as an ADSL device, that is plugged into it and secondly in the ‘customer side’ of a wall-port in order that the PDX unit via the wallport can provide data, control and power out of the wallports in order to send power and data to any device, such as a computer, which is plugged into that wall-port. The invention may be embodied as a connector providing a connection between the PDX unit and each of a plurality of wall-ports, or a connection between two or more wall-ports.

For the avoidance of doubt the term wall-port is intended to include any device, typically recessed flush with a wall, that is capable of acting as an interface and in use is connected to a PDX unit, by way of a hybrid cable, and provides an inlet (usually via a front plate) for power and data, to equipment and peripherals such as: computers, printers telephones, IP enabled devices, televisions and all other telecommunication equipment.

The invention will now be described by example and with reference to the accompanying drawings, of which:

DETAILED DESCRIPTION OF PREFERRED EMBODIMENTS

Figure 1:
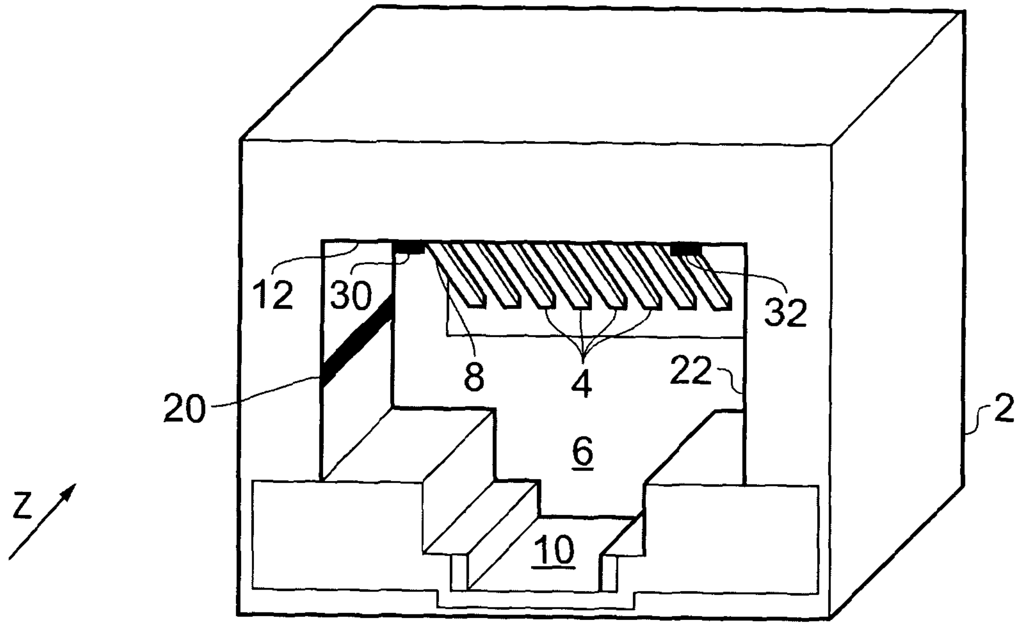
FIG. 1 shows a socket of a connector according to the invention.

FIG. 1 shows a socket 2 of an example of one type of connector according to one aspect of the invention. A plug-in area or aperture 6 of the socket is provided which opens against a plug-in direction (Z). A plurality of contact springs 4 disposed in a row next to each other are provided within the aperture 6; the contact springs 4 form an inclined surface 8 projecting into the aperture 6. A second pair of contacts 20, 22 is provided within the aperture 6 of the socket 2. In this example, the second pair of contacts 20, 22 are disposed one on each of two opposite walls of the aperture 6 and consist of a metal strip to provide a power connection from the socket. An additional pair of contacts 30, 32 comprising optical fibre connectors is provided within the aperture 6 on the upper surface 12 of the aperture 6.

The second pair of contacts 20, 22 for providing power can be located on any internal surface of the aperture 6 providing that the function of any existing features (such as the contact springs 4) is not impaired and that the two contacts are sufficiently separated that there is no chance of a short circuit so enabling the socket to receive existing cat 5 type plugs and preventing inadvertent use of the plug in a conventional socket. A person skilled in the art would appreciate these limitations.

The additional pair of contacts 30, 32 for providing an optical connection are locatable anywhere within the aperture that does not impact the insertion of a plug into the socket or interfere with any of the other connectors or features provided on a standard plug and socket connector of this type, e.g. an Ethernet or USB connector.

The socket may be provided with a recess 10 for engaging a corresponding protuberance on a plug. One reason for such a protuberance is to ensure that the plug can only be inserted in one orientation.

Figure 2:
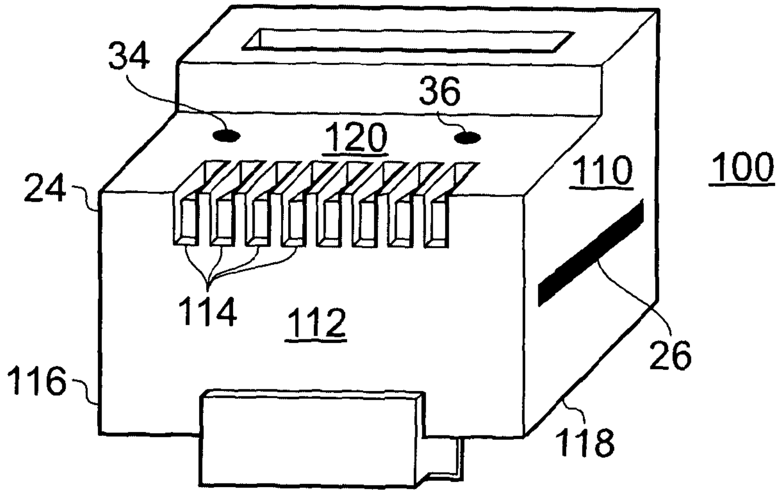
FIG. 2 shows a plug according to the invention adapted to be received by the socket described in FIG. 1.

FIG. 2 shows a plug 100 of a connector according to the invention. The plug 100 has an outwardly projecting portion 110 comprising an initially inserted face 112 which is the face that is inserted initially into a socket when a connection between a plug and socket is made. The initially inserted face 112 includes a plurality of grooves 114 disposed in a row next to each other. These grooves 114 co-operate with the contact springs 4 provided within the socket 2.

A second pair of contacts 24, 26 is provided one on each of opposite sidewalls 116,118 of the outwardly projecting portion 100 and consist of a strip of conductive material. This second pair of contacts 24, 26 co-operates with the second pair of contacts 20, 22 of the socket 2 on insertion of the plug into the socket and provides a power connection between the plug 100 and socket 2. A third pair of contacts 34, 36 is also provided on the upper surface 120 of the outwardly projecting portion and consists of optical fibre connectors. This third pair of contacts 34, 36 is for providing an optical connection between the plug and the socket when the plug is inserted in the socket, by contacting the additional pair of contacts 30, 32 of the socket 2.

It should be noted that although the contact springs 4 and grooves 114 co-operate with each other when the plug is inserted into the socket, there does not need to be an equal number of the contact springs and grooves. Additionally the exact location of the second and third pairs of contacts is unimportant as long as the existing functionality of the plug and socket is not compromised. The skilled person will appreciate that a number of configurations are available.

Figure 3A:
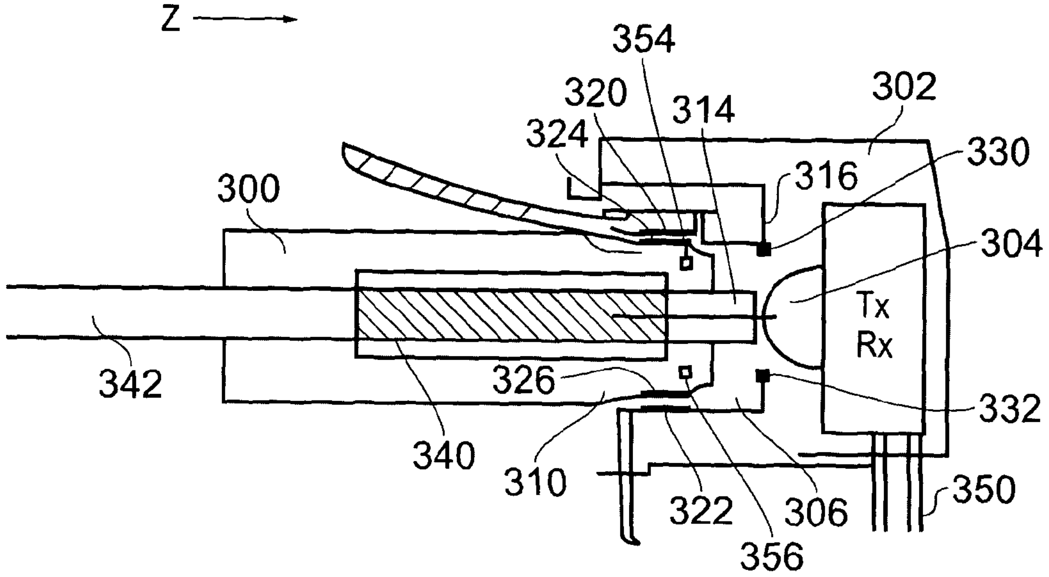
FIGS. 3A, 3B and 3C show cross-sections through an alternative plug inserted in a socket.
Figure 3B:
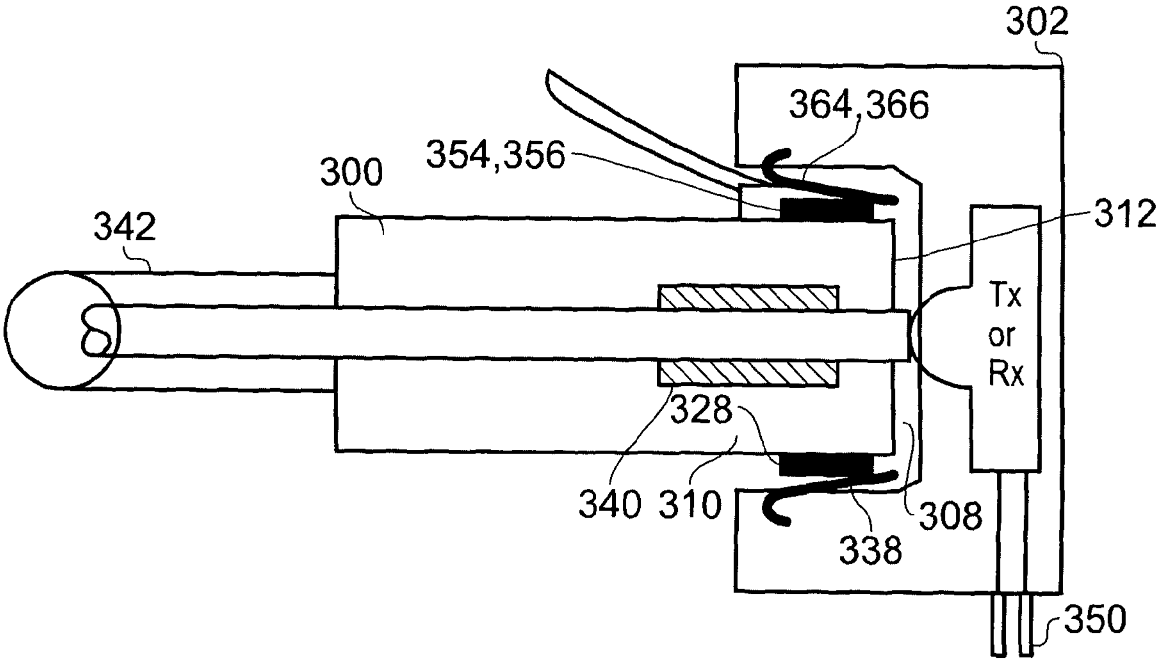
Figure 3C:
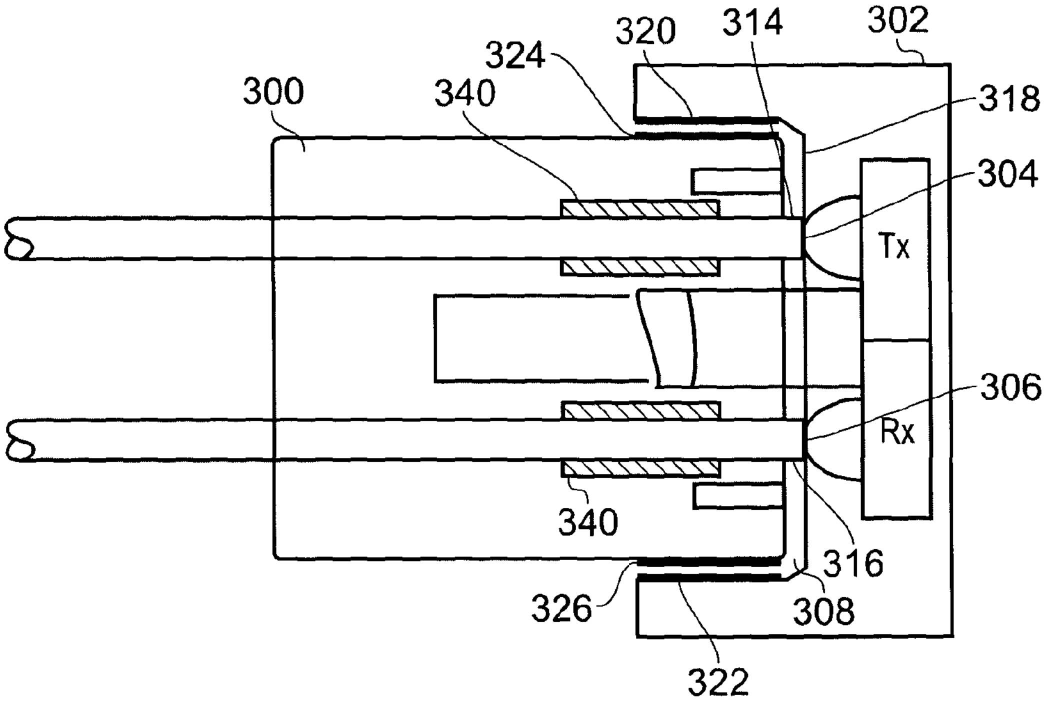
Figure 4:
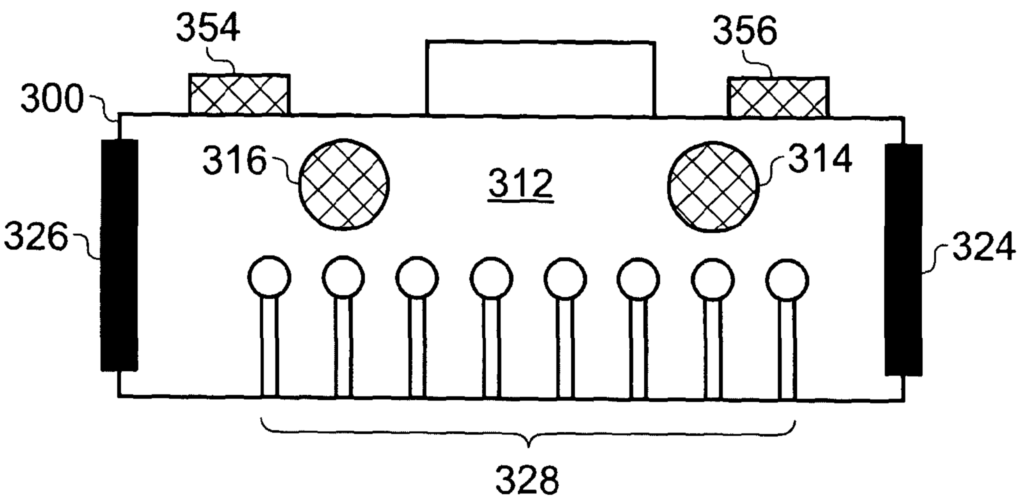
FIG. 4 shows schematically the end of the outwardly projecting portion of the alternative plug of FIGS. 3A, 3B and 3C.

FIGS. 3A, 3B, 3C and 4 show an alternate plug and socket connector according to the invention. FIGS. 3A to 3C show a plug 300 inserted into the aperture 308 of a socket 302 and FIG. 4 shows schematically the end or initially inserted face 312 of an outwardly projecting portion 310 of the plug 300.

In this example, the socket 302 (FIGS. 3A-C) includes a transmitter (Tx) and receiver (Rx) which are hard wired 350 to a further device (not shown). First connections 304, 306 between the transmitter (Tx) and receiver (Rx) and corresponding optical fibre connections 314, 316 of a plug 300 are provided in an aperture 308 of the socket 302. A second pair of connectors 320, 322 comprising a conductive strip is provided one located on each of two opposite walls of the aperture 308 in the socket 302.

Mating parts are connectors 324, 326 on opposite faces of the plug 300. A third set of contacts 328 on the plug 300 relate to a set of contacts 338 in the socket 302. This third set of contacts 328 is physically equivalent to those on an 8P8C connector. A fourth set of contacts 354, 356 are located on the opposite face to the third set of contacts. The fourth set of contacts 354, 356 on the plug 300 relate to a set of contacts 364, 366 in the socket 302.

The plug 300 is adapted to be at least partially inserted within socket 302 to provide at least one connection out of the plurality of different connections and connector types available. To achieve this, the plug has a slightly narrowed part, the outwardly projecting portion 310, which is capable of insertion into the aperture of the socket 302.

Firstly, an optical connection is provided between fibres 314, 316 in the plug 300 and first connections 304, 306 in the socket 302 being the optical element of the Rx and Tx elements. Secondly a substantial power, as described above, connection is provided by the lateral metal contacts 324, 326 on the plug 300 and correspondingly located lateral contacts 320, 322 in the socket 302. Thirdly a typical standard 8-way category 5 connection 328 (third set of contacts) is provided on plug 300, and the connection provided by the corresponding set of contacts 338 in the socket 302. Fourthly extra data connections are available on the same face as the polarising and locking pip. These contacts, 354, 356 on plug 300 and corresponding contacts 364, 366 in socket 302, are available for programming or other serial communication purposes.

In this example, the plug 300 has an internal springy sleeve 340 which biases the optical fibre 314 or 316 towards the corresponding connection 304 or 306 in the socket 302 to provide a positive connection.

In this example, the second (power) connectors 320, 322, 324, 326 are shown as conductive i.e. metal or metallic strips which run along the plug insertion direction (Z). The exact shape and orientation of the connectors is unimportant, however, it is prudent to make one pair of the strips slightly larger than the other to allow for slightly variations in the relative locations of the plug and socket, thus ensuring a good connection.

A connection is available which provides an optical fibre connection between the plug and socket. This connection can be used in addition to or separately from the power connection, indeed the plugs and sockets do not necessarily have to have the same sets of connections. Two optical fibre connectors 304, 306 are provided in the socket 302. When a plug 300 is inserted, these two optical fibre connectors 304, 306 co-operate with correspondingly located optical fibre contacts 314, 316 on the plug. In this example the optical fibre contacts 314, 316 are provided on the end face 312 of the plug and contacts 304, 306 on the surface of the aperture 308, specifically the end wall 318 of the aperture 308.

A fourth possible connection is also shown in FIGS. 3A to 3C and 4. This further connector is, for example, data I2C programming. Two connectors 354, 356 are shown on the plug 300 and the corresponding connections 364, 366 are provided within the aperture of the socket 302 beside the polarising pip. I2C is a protocol for communications between I/Cs. The connector enables a programmer to edit, save, and program EPROMs.

An advantage of the invention is that it provides a completely flexible solution from the transmission of data and low power electricity. In the preferred arrangement of 8 pins (data) and two pins (power), the plug and socket system provides a hybrid cable solution that accommodates data input from a variety of sources, such as an Internet service provider, a telecommunications provider (conventional twisted copper wire) and a fibre optic source (such as broadband television service channels), as well as providing a path for power.

What is also noteworthy is that data is able to be transmitted and received, as the data bus in all modes (ISP, conventional twisted copper wire and optical fibre), is bidirectional so enabling voice over IP, Internet surfing, as well as interactive television, conventional voice communications and on-demand video. Furthermore, as a result of the power bus (ie as provided on pins 1 and 10), power can be transmitted from a domestic generator, via a domestic wall-port, to a power/data exchange and thence to a mains supply metering unit to a local grid. This facility thus provides a completely flexible solution for power and data and so permits subscribers to export locally generated electricity for sale to the grid.

Any data or power provided from the connections 304, 320, 322, 330, 332 and I2C connectors in the socket 302 is transferred via a cable 342 to a further plug (not shown) which may be of the same type or one that accepts only data in one format or power or any combination thereof. This further plug can be connected to a computer, printer, television, lamp or a combined data and power ring main wired into a room or a building like a hybrid of an electrical circuit and data network. Data and power can obviously also flow from a plug to a socket for example at the other end of a cable 342 at the further plug.

The optical fibre used for the optical connection can be glass however, for most domestic applications, a mono mode plastic cable is preferred. Firstly, as plastic cable is safer within the home and; secondly, the data transmission provided by plastic fibres is sufficiently good for most domestic uses. For distances of less than 100 m, the signal to noise ratio of plastic cable is acceptable and this length of cable is more than enough for most domestic requirements. The optical fibre can be any suitable standard optical fibre which is readily available in the market.

The use of an optical cable provides a higher specification data cable than conventional. An optical cable also provides a signal having a wide band of frequencies.

In all examples, the metal contacts 20, 22, 320, 322 within the socket 2, 302 are capable of providing power to an inserted plug 100, 300. The metal contacts 20, 22, 320, 322 comprise metal strips or blocks of copper, a copper alloy or another good metallic conductor. The metal contacts 20,22, 320,322 are provided on opposite sides of the aperture 6,308 of the socket 2,302 and, on insertion of a plug 100, 300, correspondingly located metal portions 24, 26,324, 326 disposed one on each side of the outwardly protruding portion 310 of the plug 100,302 contact the metal contacts 20, 22, 320, 322. One pair of the metal contacts or portions, preferably the pair 20, 22, 320, 322 provided in the socket, can be sprung such that on insertion of a plug into the socket, these contacts are flattened slightly. This ensures both a good electrical connection between the plug and the socket but also provides increased mechanical stability of the plug within the socket.

The power connection described in this document can provide 48 Volts without significant adaptation of the socket for safety or legislative reasons. The power provided can be used to run computers, lamps and general ring main devices such as fridges, televisions and radios i.e. low current devices. This type of connection can be used as an emergency back-up for power which advantageously can also provided emergency back-up for data in the event of a power cut or other disruptive event. The power connection can be advantageous for other reasons than those described thus far. It can supplement the power available from a USB type of connector which typically runs at 5 v, the invention enables a higher voltage capability than the USB connector enabling better connectivity between devices.

FIG. 4 shows an end on view of the plug 300. The basic format of the 8P8C connector is retained with the connections 328. The lateral power connections 324, 326 occupy a clear area on the 8P8C connector. There is a variant of a standard Ethernet connector that uses a screened cover. The plug and socket of the present invention, in its keyed version (FIG. 12), prevents interconnection with such a standard connector. The master version (FIG. 13), on the other hand, fit with such a standard connector. The power supply that is connected to the lateral power connectors 324, 326 is current limited to a safe value under these conditions.

The optical fibre is shown as 314 and 316. The option exists to have a single fibre with a directional splitter, if required. This may be fitted within the plug or socket. It is clear that though two fibres are shown here, there is room for more fibres in this position if required. The auxiliary data connections 354, 356 can be used for a multiplicity of functions. In one particular application for installation of this connector in a wall plate power and data distribution system these pins are used to obtain access to the internal circuitry within the wall plate to allow for programming and routing information to be accessed and uploaded, without the need for extra connectors to be fitted to the wall plate. Other uses for this connection is as a high power USB option, other voltage supplies etc. Note that only two auxiliary data connections are shown in this area of the connector but this can be increased to about 6 or more.

Figure 5A:
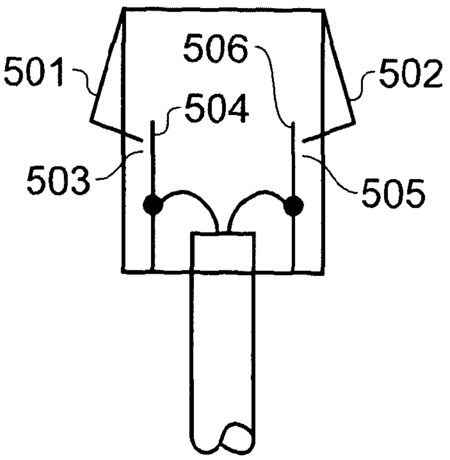
FIG. 5A shows one embodiment of a power circuit isolator on a plug
Figure 5B:
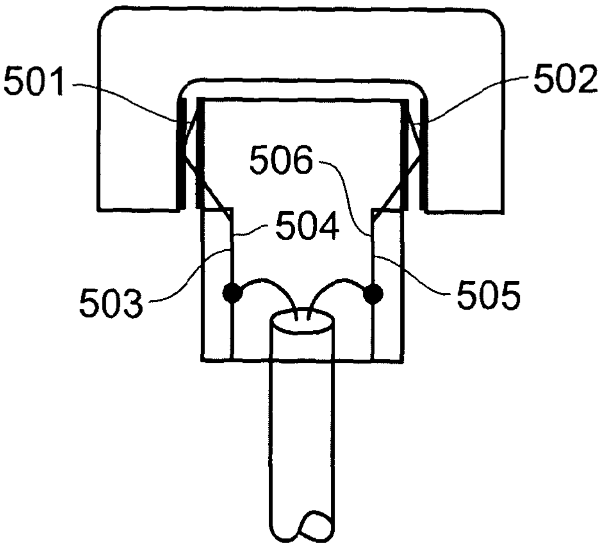
FIG. 5B shows the embodiment of a power circuit isolator on a plug in FIG. 5B inserted in a socket with the sprung contacts connected to electrical contacts in the socket.

FIG. 5A shows one embodiment of a power circuit isolator on a plug. The side contacts 501 and 502 are electrically isolated from the cable conductor when the plug is not inserted (as illustrated in the left-hand detail in FIG. 5A). The side contacts 501, 502 are sprung so that they extend outwardly from the plug when under no external force. The action of insertion causes the side contacts 501, 502 to be urged inwardly towards one another so that the side contacts 501, 502 come into contact with electrical contacts 504, 506, respectively (as illustrated in the right-hand detail of FIG. 5B, in which the features of the plug are identical to the features illustrated in the left-hand detail). The electrical contacts 504, 506 are electrically connected to a power supply (not shown), and the contact connection enables power to be transferred to the side contacts 501 and 502. When the plug is not inserted in the socket the power circuit is completely isolated.

Figure 6:
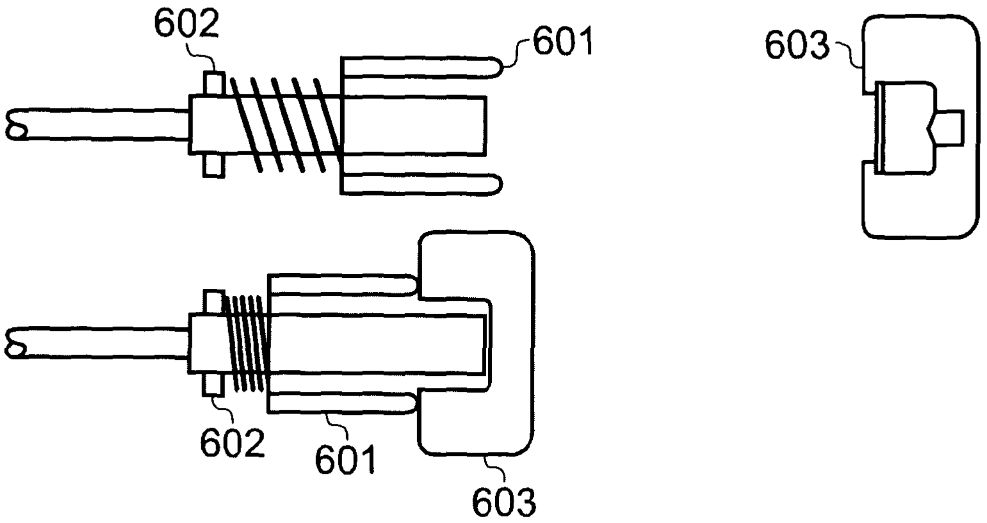
FIG. 6 shows one embodiment of a shroud to protect exposed conductors on a plug when not inserted into a mating socket.

FIG. 6 shows one embodiment of a shroud to protect exposed conductors on a plug 602 when it is not inserted into a mating socket 603. The contacts (not shown) are shrouded when the plug is floating (i.e. not in a socket). The action of insertion of the plug 602 into the socket 603 causes the shroud 601 to be pushed back over plug 602 to reveal the contacts. Upon removal of the plug 602, resilient, sprung or other return means ensure that the shroud is displaced to its closed position, thereby isolating any earth paths.

Figure 7:
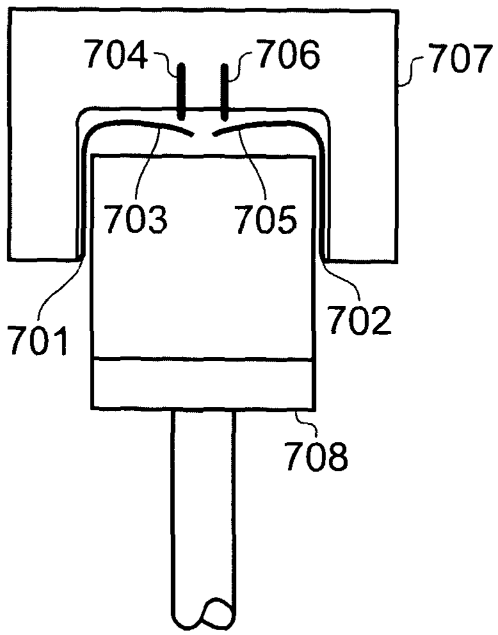
FIG. 7 shows one embodiment of a power circuit isolator on a socket.

FIG. 7 shows an embodiment of a power circuit isolator on a socket 707. The contacts 701 and 702 are isolated by contacts 703, 704, 705 and 706 from the power available to the socket 707. The action of insertion of the plug 708 into socket 707 enables the connection of contacts 703, 704, 705 and 706 thus putting power onto contacts 701 and 702.

Figure 8:
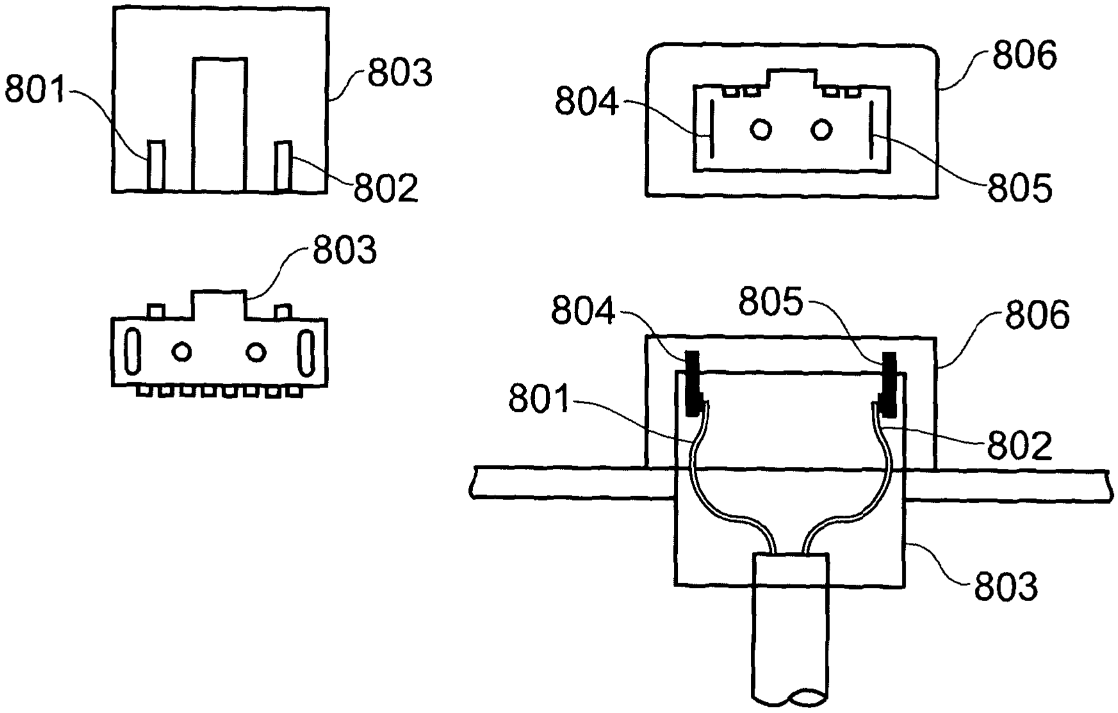
FIG. 8 shows an alternative embodiment of lateral power circuit contacts of reduced length in socket and shrouded by plug moulding.

FIG. 8 shows an alternative embodiment of lateral power circuit contacts of reduced length in socket and shrouded by plug moulding. In this embodiment, the power may be present on either the contacts 801 and 802 in the plug 803 or on the reduced length contacts 804 and 805 in the socket 806.

Figure 9:
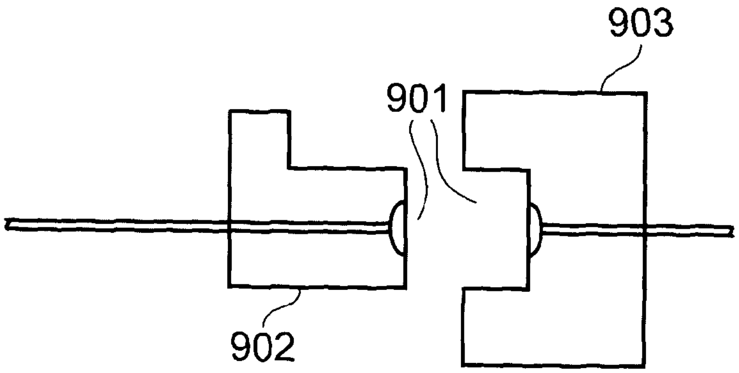
FIG. 9 shows an optical lens option for lower loss.

FIG. 9 shows an embodiment having an optical lens option for lower loss. For maximum optical power transfer, a lens 901 can be included in the plug 902 and/or socket 903.

Figure 10:
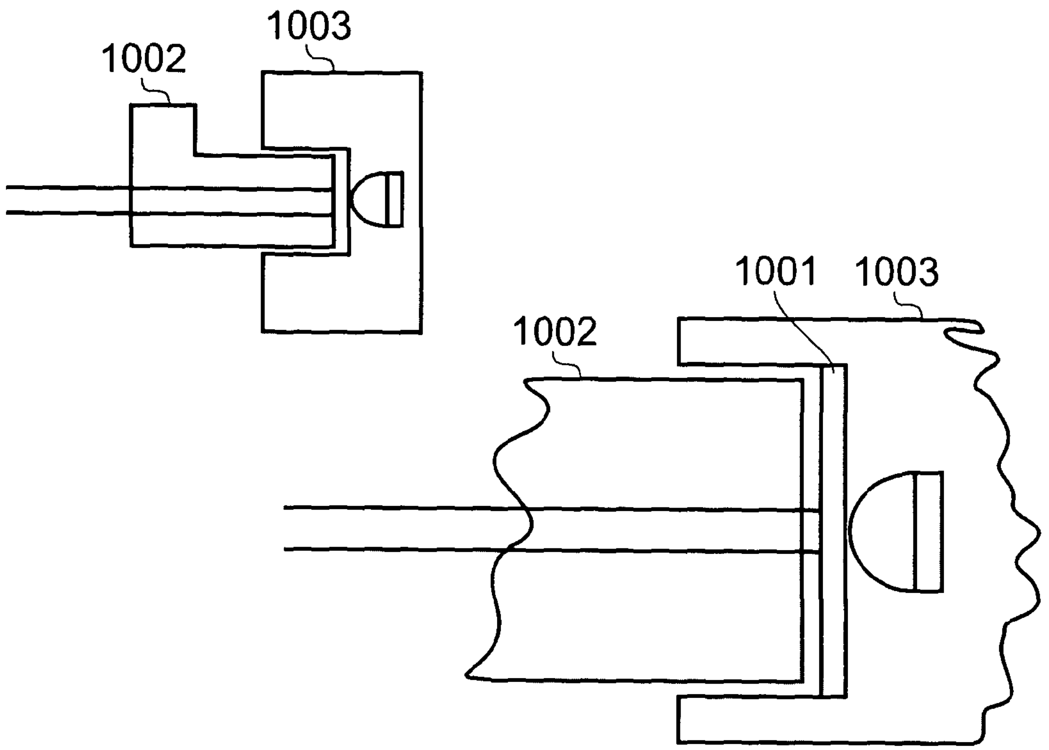
FIG. 10 shows a position for refractive index matching material.

FIG. 10 shows an embodiment having an optical lens with a location for refractive index matching material. For maximum optical power transfer, refractive index matching material 1001 can be included in the plug 1002 and/or socket 1003.

Figure 11:
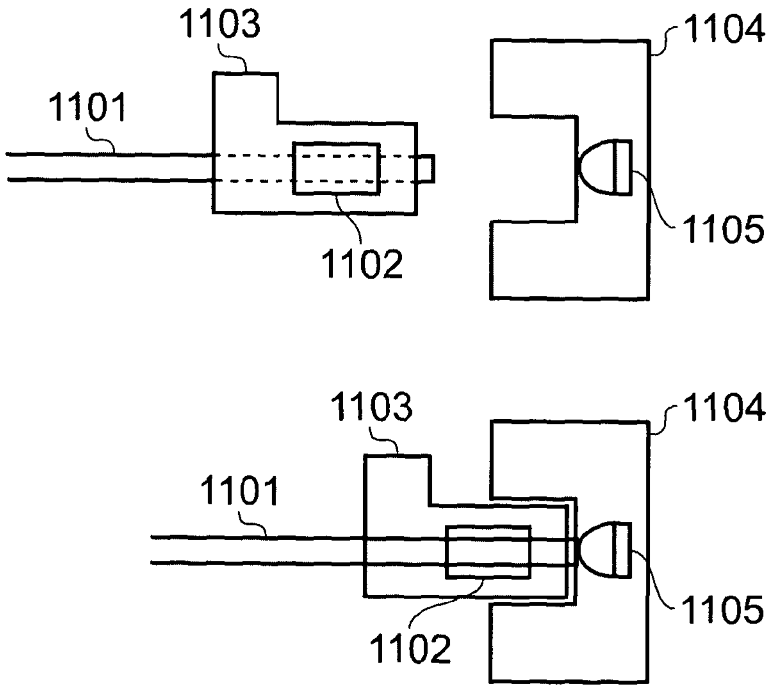
FIG. 11 shows a detail of one embodiment of retainer for optical fibre to ensure positive pressure between light transmission elements in the plug and socket.

FIG. 11 shows in detail of one embodiment of a retainer for an optical fibre to ensure positive pressure between light transmission elements in the plug and socket. To overcome tolerances in the plug and socket assembly, the optical fibre 1101 is held slightly proud by retainer 1102 so that when the plug 1103 is fully mated with the socket 1104 the optical fibre exerts a positive pressure on the optical receiver or transmitter 1105.

Figure 12:
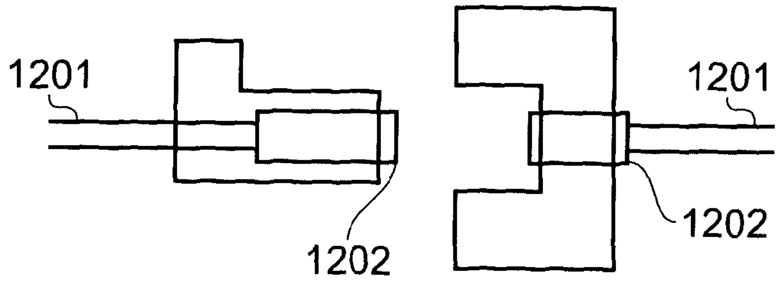
FIG. 12 shows a combined fibre and conductor option.

FIG. 12 shows a combined fibre and conductor option. In this embodiment, the fibre 1201 is encased in a metallic sheath 1202. Metallic sheath 1202 can perform the dual function of securing and straightening the optical fibre as well as providing an electrical current path for the power or data.

Figure 13:
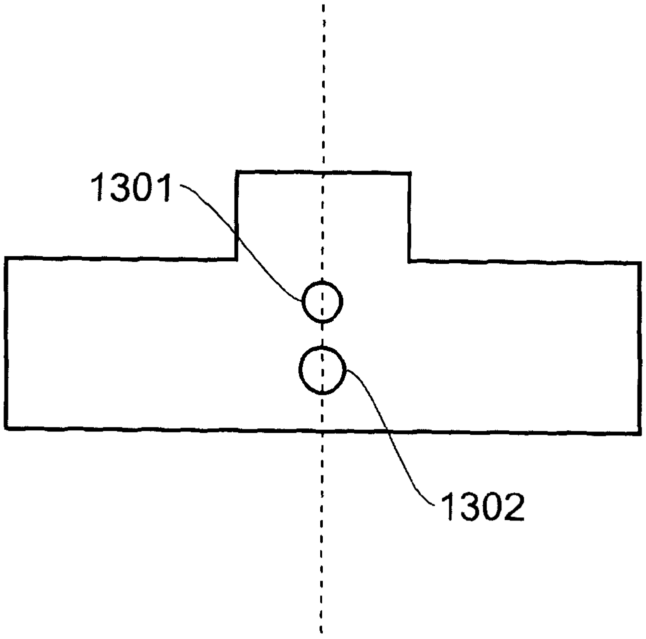
FIG. 13 shows an alternative fibre arrangement to avoid crossover issues.

FIG. 13 shows an alternative fibre arrangement to avoid crossover issues. By positioning the optical fibres 1301, 1302 about the central axis of the plug or socket, issues relating to crossover can be resolved.

Figure 14:
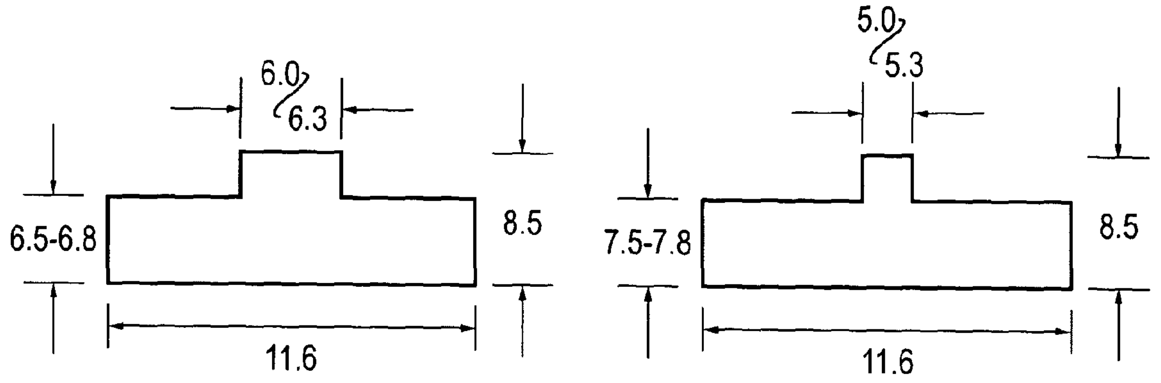
FIG. 14 shows a plug option to achieve keying.

FIG. 14 shows a plug with an optional pip or raised portion to achieve keying and thereby ensure against inadvertent insertion into a non compatible socket. One example of altering the dimensions and shape of the plug and socket from the standard 8P8C connector is so that the proposed plug do not fit a standard 8P8C socket; and also a standard 8P8C plug does not fit the socket according to the invention. Increased height of body of the plug will not fit into existing 8P8C socket. Decreased pip width of the socket will not allow access to wider pip of standard 8P8C plug.

Figure 15:
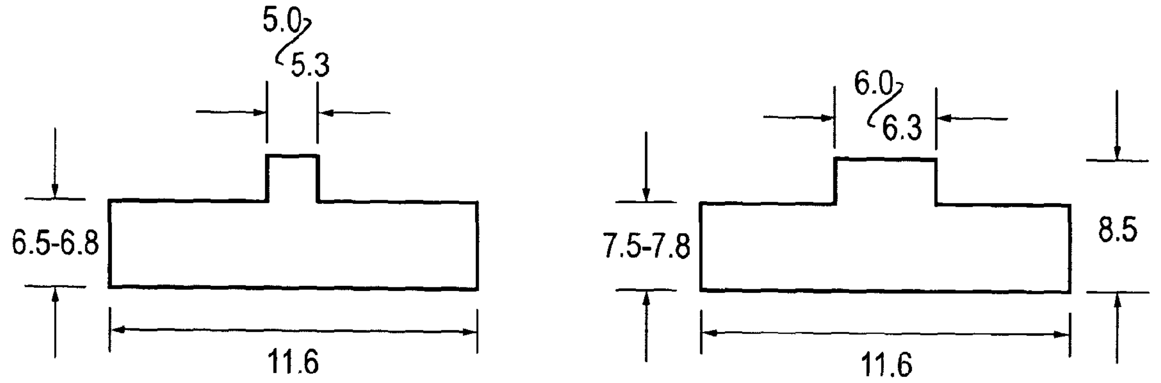
FIG. 15 shows a plug option with master keying function.

FIG. 15 shows a plug option with master keying function. By amending certain features of the keying it is possible to produce a master plug that fits in a standard 8P8C socket and a modified socket. Likewise it is possible to produce a master socket that accepts both a standard 8P8C plug and a modified plug.

Although in the examples shown there are three or four connectors, the invention is not limited to this, for example an extra pair of optical fibre connectors can be provided. The limitations on how many connectors or data pins is a function of the size of the plug and socket, whether there is a requirement to match a standard plug-in connector unit and the cost that a purchaser finds acceptable.

Plug-in connectors according to the invention can provide one or more of the following: optic fibre connection which can be glass or plastic depending on requirements; a power supply; a typical 8 way cat 5 connection; power over Ethernet, programming input; extra data pins; and USB type application with higher voltage capability.

The invention is particularly well suited for the control of systems, such as for example household appliances, lights and devices, as the power (eg in pins 1 and 10 or the lateral faces) can be modulated, for example by way of amplitude modulation and/or frequency modulation, so as to control such devices simply and cheaply. This aspect also consumes very little power as the bandwidth is low.

The invention has been described by way of illustrative examples only and it will be appreciated that variation to the embodiments described may be made without departing from the scope of the invention as defend in the claims.

The invention claimed is:

1. A plug is adapted to be connected to a cable, the plug has electrical contacts and a generally rectangular cross section that is dimensioned and arranged to be received by an aperture in a socket; a conductor is provided on each of two opposite lateral faces of the plug, said conductors are isolated from electrical connection with the cable that is connected to the plug, prior to insertion of the plug into the socket (floating); and a means is provided to urge the electrical conductors to connect to the cable when the plug is inserted into the socket, whereby insertion of the plug into the socket causes the conductors to connect to contacts on opposite lateral faces of the socket so as to permit transmission of electrical current to/from the cable, via the conductors in the plug, to contacts in the socket.

2. A plug according to claim 1, wherein the shroud is mounted on the plug and is displaceable with respect to the plug.

3. A plug according to claim 2, wherein a resilient means displaces the at least one shroud, to a closed position upon removal of the plug from the socket.

4. A plug according to claim 1, wherein the conductors have conductive faces that are capable of carrying in excess of 3 Amps of current.

5. A plug according to claim 1, wherein the conductors have conductive faces that are capable of carrying in excess of 5 Amps of current.

6. A plug according to claim 1, wherein the conductors have conductive faces that are capable of carrying in excess of 10 Amps of current.

7. A plug according to claim 4, wherein the conductive faces are capable of supplying in excess of 50 Watts of power.

8. A plug according to claim 5, wherein the conductive faces are capable of supplying in excess of 200 Watts of power.

9. A plug according to claim 6, wherein the conductive faces are capable of supplying in excess of 500 Watts of power.

10. A plug according to claim 1 includes at least one optical communication cable.

11. A plug according to claim 10, wherein the optical communication cable is formed from a polymer optical fibre.

12. A plug according to claim 10 includes a support for said at least one optical communication cable, the support being displaceable with respect to an opto coupler which is adapted to cooperate with an external optical communication channel.

13. A plug according to claim 1 includes a pip, lug or projection dimensioned and arranged so as to prevent inadvertent insertion of the plug into a non-compatible socket.

14. A plug is adapted to be connected to a cable, the plug has a generally rectangular cross section that is dimensioned and arranged to be received by an aperture in an electrical socket; an electrical conductor is provided on each of two opposite lateral faces of the plug; at least one shroud isolates the electrical conductors prior to insertion of the plug into the socket (floating) from electrical contacts in the socket, whereby the action of inserting the plug into the socket causes the at least one shroud to displace so permitting the conductors of the plug to connect to contacts in the socket and thereby enables transmission of electrical current to/from the cable via conductors in the plug, to contacts in the socket.

15. A plug according to claim 14, wherein the shroud is mounted on the plug and is displaceable with respect to the plug.

16. A plug according to claim 15, wherein a resilient means displaces the at least one shroud, to a closed position upon removal of the plug from the socket.

17. A plug according to claim 14, includes a plurality of connections supported on the plug for transmitting and receiving signals to and/or from at least one data channel.

18. A plug according to claim 14, wherein the conductors have conductive faces that are capable of carrying in excess of 3 Amps of current.

19. A plug according to claim 14, wherein the conductors have conductive faces that are capable of carrying in excess of 5 Amps of current.

20. A plug according to claim 14, wherein the conductors have conductive faces that are capable of carrying in excess of 10 Amps of current.

21. A plug according to claim 18, wherein the conductive faces are capable of supplying in excess of 50 Watts of power.

22. A plug according to claim 19, wherein the conductive faces are capable of supplying in excess of 200 Watts of power.

23. A plug according to claim 20, wherein the conductive faces are capable of supplying in excess of 500 Watts of power.

24. A plug according to claim 14 includes at least one optical communication cable.

25. A plug according to claim 24 wherein the optical communication cable is formed from a polymer optical fibre.

26. A plug according to claim 24 includes a support for said at least one optical communication cable, the support being displaceable with respect to an opto coupler which is adapted to cooperate with an external optical communication channel.

27. A plug according to claim 14 includes a pip, lug or projection dimensioned and arranged so as to prevent inadvertent insertion of the plug into a non-compatible socket.

28. A socket has an aperture which receives a plug there being a plurality of contacts arranged to receive signals from one or more data carrying connections on the plug, when inserted in the socket, and contacts are provided in the socket for making electrical connection with said conductors so as to supply electrical current to power a device, there being a means to isolate the contacts in the socket, when the plug with conductors is removed therefrom so as to prevent inadvertent shorting.

29. A socket according to claim 28, includes a shroud provided in the socket and at least one shutter or cover arranged to isolate the at least one contact.

30. A socket according to claim 29 wherein a resilient means displaces the at least one shutter or cover to its closed position upon removal of the plug from the socket.

31. A socket according to claim 28 wherein a pair of contacts is provided said contacts are adapted to provide a data connection in addition to a power supply.

32. A socket according to claim 28 wherein the aperture is shaped and configured to receive a conventional standard 8 way category 5 plug.

* * * * *